(12) United States Patent
Yu

(10) Patent No.: US 12,040,455 B2
(45) Date of Patent: Jul. 16, 2024

(54) ELECTROCHEMICAL ENERGY STORAGE APPARATUS AND DEVICE

(71) Applicant: CONTEMPORARY AMPEREX TECHNOLOGY CO., LIMITED, Ningde (CN)

(72) Inventor: Yang Yu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 107 days.

(21) Appl. No.: 17/589,714

(22) Filed: Jan. 31, 2022

(65) Prior Publication Data
US 2022/0158259 A1 May 19, 2022

Related U.S. Application Data

(63) Continuation of application No. PCT/CN2020/106474, filed on Jul. 31, 2020.

(30) Foreign Application Priority Data

Aug. 8, 2019 (CN) .......................... 201910730977.1

(51) Int. Cl.
*H01M 10/42* (2006.01)
*H01M 4/02* (2006.01)
(Continued)

(52) U.S. Cl.
CPC ......... *H01M 10/4235* (2013.01); *H01M 4/13* (2013.01); *H01M 10/0525* (2013.01); *H01M 2004/028* (2013.01)

(58) Field of Classification Search
CPC ............... H01M 10/4235; H01M 4/13; H01M 10/0525; H01M 2004/028; H01M 4/628; H01M 10/44; H01M 10/052; Y02E 60/10
(Continued)

(56) References Cited

U.S. PATENT DOCUMENTS

2014/0120423 A1* 5/2014 Matsuo ................. H01M 4/663
429/231.1
2014/0342200 A1* 11/2014 Morita .............. H01M 10/0525
429/61
(Continued)

FOREIGN PATENT DOCUMENTS

CN  105810885 A  7/2016
CN  107768589 A  3/2018
(Continued)

OTHER PUBLICATIONS

Contemporary Amperex Technology Co., Limited, Extended European Search Report, EP20850741.8, dated Aug. 1, 2022, 5 pgs.
(Continued)

*Primary Examiner* — Robert S Carrico
(74) *Attorney, Agent, or Firm* — Kilpatrick Townsend & Stockton LLP

(57) ABSTRACT

An electrochemical energy storage apparatus and a device are provided. The electrochemical energy storage apparatus includes a positive electrode plate, a negative electrode plate, a separator, and an electrolyte, where the positive electrode plate includes a positive electrode current collector, a positive electrode active substance layer disposed on at least one surface of the positive electrode current collector, and a safety layer disposed between the positive electrode active substance layer and the positive electrode current collector; the positive electrode active substance layer includes a positive electrode active substance; the safety layer includes a binding substance, a conductive substance, and an overcharge sensitive substance; the overcharge sensitive substance is a polymer containing monosaccharide structural units and containing at least one of carbonate groups or phosphate groups; the electrolyte
(Continued)

includes a solvent and an electrolytic salt; and the solvent includes a carbonate-based solvent.

18 Claims, 3 Drawing Sheets

(51) Int. Cl.
    *H01M 4/13*     (2010.01)
    *H01M 10/0525*     (2010.01)
(58) Field of Classification Search
    USPC .......................................................... 429/96
    See application file for complete search history.

(56) References Cited

U.S. PATENT DOCUMENTS

| | | |
|---|---|---|
| 2018/0294472 A1 | 10/2018 | Fan |
| 2020/0381774 A1 | 12/2020 | Ueno et al. |

FOREIGN PATENT DOCUMENTS

| | | |
|---|---|---|
| CN | 108258249 A | 7/2018 |
| CN | 108987666 A | 12/2018 |
| CN | 109755466 A | 5/2019 |
| CN | 110265665 A | 9/2019 |
| CN | 110474114 A | 11/2019 |
| JP | H08329978 A | 12/1996 |
| JP | 2000100437 A | 4/2000 |
| JP | 2010108716 A | 5/2010 |
| JP | 2016076439 A | 5/2016 |

OTHER PUBLICATIONS

International Search Report and Written Opinion, PCT/CN2020/106474, dated Oct. 28, 2020, 23 pgs.
Ningder Age New Energy Technology Co. Ltd., First Office Action, CN201910730977.1, dated Jul. 2, 2020, 11 pgs.
Notice of Allowance received in the corresponding U.S. Appl. No. 17/589,705, mailed Oct. 26, 2023.
Non-Final Office Action received in the corresponding U.S. Appl. No. 17/589,711, mailed Jul. 18, 2023.

* cited by examiner

ELECTROCHEMICAL ENERGY STORAGE APPARATUS AND DEVICE

CROSS-REFERENCE TO RELATED APPLICATIONS

This application is a continuation application of PCT Patent Application No. PCT/CN2020/106474, entitled "ELECTROCHEMICAL ENERGY STORAGE APPARATUS AND DEVICE" filed on Jul. 31, 2020, which claims priority to Chinese Patent Application No. 201910730977.1, filed with the China National Intellectual Property Administration on Aug. 8, 2019 and entitled "ELECTROCHEMICAL ENERGY STORAGE APPARATUS", both of which are incorporated herein by reference in their entirety.

TECHNICAL FIELD

This application relates to the electrochemistry field, and in particular, to an electrochemical energy storage apparatus and a device.

BACKGROUND

Charging and discharging of lithium-ion secondary batteries mainly rely on migration of lithium ions between positive electrode active substances and negative electrode active substances. Lithium-ion secondary batteries can provide stable voltage and current in a green way in use, and therefore have been widely used in various electric equipment, such as mobile phones, tablet computers, notebook computers, electric bicycles, and electric vehicles. However, while lithium-ion secondary batteries benefit human beings, safety problems such as fires and explosions during charging are also reported from time to time, posing great threats to people's lives and property safety.

SUMMARY

In view of the foregoing shortcomings of the prior art, the objectives of this application are to provide an electrochemical energy storage apparatus and a device to resolve the problems in the prior art.

To achieve the above and other related objectives, one aspect of this application provides an electrochemical energy storage apparatus, including a positive electrode plate, a negative electrode plate, a separator disposed between the positive electrode plate and the negative electrode plate, and an electrolyte, where the positive electrode plate includes a positive electrode current collector, a positive electrode active substance layer disposed on at least one surface of the positive electrode current collector, and a safety layer disposed between the positive electrode active substance layer and the positive electrode current collector, the positive electrode active substance layer includes a positive electrode active substance, and the safety layer includes a binding substance, a conductive substance, and an overcharge sensitive substance;

the overcharge sensitive substance is a polymer containing monosaccharide structural units and containing at least one of carbonate groups or phosphate groups; and
the electrolyte includes a solvent and an electrolytic salt, and the solvent includes a carbonate-based solvent.

In the electrochemical energy storage apparatus provided in this application, the safety layer of the positive electrode plate includes an overcharge sensitive substance, where the overcharge sensitive substance is a polymer containing monosaccharide structural units and containing at least one of carbonate groups or phosphate groups; and the electrolyte system is a carbonate solvent system and has good compatibility with the overcharge sensitive substance. During charging of the electrochemical energy storage apparatus, if overcharge abuse occurs, excessively high voltage and temperature lead to degradation of the overcharge sensitive substance in the safety layer. Sugar unit fragments containing carbonate groups or phosphate groups that are produced after degradation can be quickly miscible in electrolytes containing a large amount of carbonate solvents, and transform from macromolecular chains that are difficult to move freely into a micromolecular solution or sol that can move freely, pushing the conductive substance in the safety layer to move together, thereby destroying the conductive network in the safety layer, blocking electronic conduction between the current collector and the positive electrode active substance layer, and cutting off the charging current in time. This effectively prevents thermal runaway of the electrochemical energy storage apparatus, avoids safety problems such as fires and explosions, and improves overcharge safety performance of the electrochemical energy storage apparatus.

PTC materials that rely on changes in crystallinity to cause volume swelling undergo physical changes under high temperature conditions. These changes are greatly affected by the preparation processes of the material coating layer and electrochemical energy storage apparatus. For example, in the preparation process of the material coating layer, temperature, coating speed, and the electrolyte in the electrochemical energy storage apparatus have an effect on the crystallinity of the material, and the effect is uncontrollable. In addition, the PTC materials are more dependent on resistance changes that occur when the battery temperature rises sharply to a specified level in the event of a short circuit or overcharge. If an electrochemical energy storage apparatus suffering from a rapid thermal runaway is overcharged, the PTC materials may not be excited, and the charging current cannot be cut off in time, so that the reliability cannot be guaranteed and potential safety hazards exist. Compared with a traditional PTC material designed as a safety layer, the electrochemical energy storage apparatus provided in this application uses the safety layer including the overcharge sensitive substance, so that the electrochemical energy storage apparatus has better reliability and safety.

According to another aspect, this application provides a battery module including the foregoing electrochemical energy storage apparatus.

According to still another aspect, this application provides a battery pack containing the foregoing battery module.

According to a yet another aspect, this application provides a device containing the foregoing electrochemical energy storage apparatus. The electrochemical energy storage apparatus can be used as a power source for the device or as an energy storage unit of the device.

The battery module, the battery pack, and the device in this application include the electrochemical energy storage apparatus provided in this application, and therefore have at least the same advantages as the electrochemical energy storage apparatus provided in this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
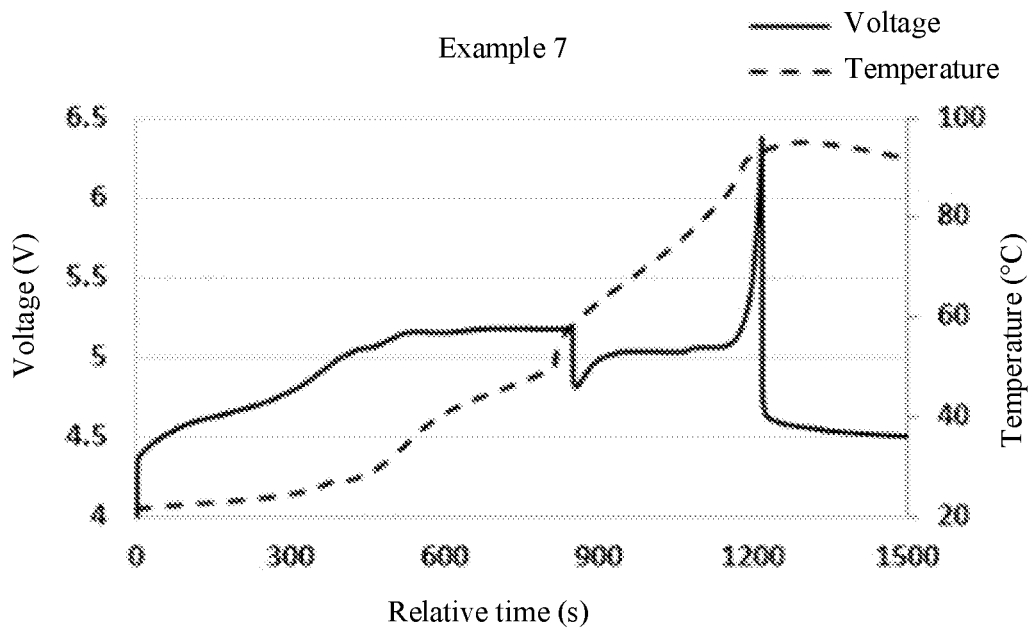
FIG. 1 is a schematic diagram of voltage and temperature changes in overcharge safety performance test for one of batteries in Example 7 of this application.

Reference signs are described as follows:
1. battery pack;
2. upper box body;
3. lower box body;
4. battery module; and
5. electrochemical energy storage apparatus

DESCRIPTION OF EMBODIMENTS

To make the objectives, technical solutions, and beneficial technical effects of this application clearer, this application is further described below in detail with reference to embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "above" and "below" a number means inclusion of the number itself, and the quantity corresponding to "more" in "one or more" means at least two.

The foregoing invention content of this application is not intended to describe each of the disclosed embodiments or implementations of this application. The following description illustrates example embodiments in more detail by using examples. Throughout this application, guidance is provided by using a series of embodiments and the embodiments may be used in various combinations. In each instance, enumeration is only representative but should not be interpreted as exhaustive.

Electrochemical Energy Storage Apparatus

This application provides an electrochemical energy storage apparatus, including a positive electrode plate, a negative electrode plate, a separator disposed between the positive electrode plate and the negative electrode plate, and an electrolyte, where the positive electrode plate includes a positive electrode current collector, a positive electrode active substance layer disposed on at least one surface of the positive electrode current collector, and a safety layer disposed between the positive electrode active substance layer and the positive electrode current collector; the positive electrode active substance layer includes a positive electrode active substance; the safety layer includes a binding substance, a conductive substance, and an overcharge sensitive substance; the overcharge sensitive substance is a polymer containing monosaccharide structural units and containing at least one of carbonate groups or phosphate groups; the electrolyte includes a solvent and an electrolytic salt; and the solvent includes a carbonate-based solvent. The positive electrode plate provided in this application may be used to form an electrochemical energy storage apparatus. When the electrochemical energy storage apparatus is overcharged, the overcharge sensitive substance in the safety layer may undergo chemical reaction under specified conditions (for example, preset temperature and preset voltage). Sugar unit fragments containing carbonate groups and/or phosphate groups that are produced after degradation can be quickly miscible in electrolytes containing a large amount of carbonate solvents, and transform from macromolecular chains that are difficult to move freely into a micromolecular solution or sol that can move freely, pushing the conductive substance in the safety layer to move together, and causing changes in the physical structure of the material. As a result, conductive material particles in the safety layer are separated from each other, causing the conductive network to break and the internal resistance of the electrochemical energy storage apparatus to increase sharply, thereby cutting off the charging current in time. In this way, thermal runaway of the electrochemical energy storage apparatus is effectively prevented, and safety problems such as fires and explosions are avoided, thereby improving overcharge safety performance of the electrochemical energy storage apparatus.

It should be noted that the electrochemical energy storage apparatus provided in this application may be a super capacitor, a lithium-ion battery, a lithium metal battery, a sodium-ion battery, or the like. In the embodiments of this application, only an embodiment in which the electrochemical energy storage apparatus is a lithium-ion battery is provided, but this application is not limited thereto.

In the electrochemical energy storage apparatus provided in this application, the overcharge sensitive substance in the safety layer of the positive electrode plate may undergo chemical reaction under specified conditions (for example, preset temperature and preset voltage), and degrades to produce a substance sugar unit fragment containing carbonate groups and/or phosphate groups. In the positive electrode plate, the degradation condition of the overcharge sensitive substance usually corresponds to the overcharge condition of the positive electrode plate or electrochemical energy storage apparatus, and a specific overcharge condition may vary with different positive electrode plates or electrochemical energy storage apparatuses. The degradation condition of the overcharge sensitive substance is associated with temperature and overcharge voltage. For example, under the condition that the positive electrode plate or electrochemical energy storage apparatus is in high operating temperature, the overcharge sensitive substance degrades when a low overcharge voltage is reached, to ensure the safe use of the electrochemical energy storage apparatus. For another example, the positive electrode plate or the electrochemical energy storage apparatus is overcharged when its own operating temperature is low, and the overcharge sensitive substance may start to degrade after a relatively high overcharge voltage is reached and temperature of part of the overcharge sensitive substance rises. However, overall temperature of the positive electrode plate is much lower than that of a positive electrode plate using the traditional PTC material. Specific degradation voltage and temperature of the overcharge sensitive substance can be adjusted according to actual needs. In some specific embodiments of this application, under the condition that the electrochemical energy storage apparatus is at a charging voltage of $\alpha$ V and temperature of $\beta°$ C., the overcharge sensitive substance in the positive electrode plate degrades, where $4.2 \leq \alpha \leq 5.5$, and preferably $4.2 \leq \alpha \leq 4.5$, $4.5 \leq \alpha \leq 4.8$, $4.8 \leq \alpha \leq 5.2$, or $5.2 \leq \alpha \leq 5.5$, and $35 \leq \beta \leq 80$, and preferably $35 \leq \beta \leq 40$, $40 \leq \beta \leq 45$, $45 \leq \beta \leq 50$, $50 \leq \beta \leq 55$, $55 \leq \beta \leq 60$, $60 \leq \beta \leq 65$, $65 \leq \beta \leq 70$, $70 \leq \beta \leq 75$, or $75 \leq \beta \leq 80$. The electrochemical energy storage apparatus falling within the foregoing ranges of a and P can ensure the normal use at normal voltage and temperature, and also ensure reliable overcharge safety performance.

In the electrochemical energy storage apparatus provided in this application, a high-capacity positive electrode plate usually undergoes thermal runaway at a faster rate in the case of overcharge. Therefore, a positive electrode plate with an appropriate capacity usually has a higher reliability in anti-fast charging. For example, single-sided capacity per unit area of the positive electrode active substance layer may range from 1.0 mAh/cm2 to 6.5 mAh/cm2, and preferably from 1.0 mAh/cm2 to 1.2 mAh/cm2, from 1.2 mAh/cm2 to 1.5 mAh/cm2, from 1.5 mAh/cm2 to 2.0 mAh/cm2, from 2.0 mAh/cm2 to 2.5 mAh/cm2, from 2.5 mAh/cm2 to 3.0 mAh/cm2, from 3.0 mAh/cm2 to 3.5 mAh/cm2, from 3.5 mAh/cm2 to 4.0 mAh/cm2, from 4.0 mAh/cm2 to 4.5 mAh/cm2, from 4.5 mAh/cm2 to 5.0 mAh/cm2, from 5.0 mAh/cm2 to 5.5 mAh/cm2, from 5.5 mAh/cm2 to 6.0 mAh/cm2, or from 6.0 mAh/cm2 to 6.5 mAh/cm2, and preferably, capacity per unit area of the positive electrode active substance layer may range from 1.2 mAh/cm2 to 4.5 mAh/cm2.

In the electrochemical energy storage apparatus provided in this application, at least one surface of the positive electrode current collector of the electrochemical energy storage apparatus is coated with a positive electrode active material layer. In a specific embodiment of this application, one surface or two surfaces of the positive electrode current collector may be coated with the positive electrode active material layer. It should be noted that the safety layer is disposed between the positive electrode current collector and the positive electrode active material layer, and therefore the number of safety layers is generally identical to the number of positive electrode active material layers. In other words, if one surface of the positive electrode current collector is coated with the positive electrode active material layer, there is one safety layer; if two surfaces of the positive electrode current collector are coated with the positive electrode active material layer, there are two safety layers. According to this application, there is no special requirement for thickness of the safety layer, provided that the technical solution of this application can be realized. For example, the thickness of the safety layer may range from 1 µm to 3 µm, and preferably from 1 µm to 1.5 µm, from 1.5 µm to 2 µm, from 2 µm to 2.5 µm, from 2.5 µm to 3 µm, or may be less than or equal to 3 µm.

In the electrochemical energy storage apparatus provided in this application, the overcharge sensitive substance may include monosaccharide structural units and may include at least one of carbonate groups or phosphate groups, so that the overcharge sensitive substance can undergo chemical reaction under specified conditions (for example, temperature and voltage conditions), and degrades to produce a substance sugar unit fragment containing carbonate groups and/or phosphate groups. In some specific embodiments of this application, the overcharge sensitive substance may be at least one of sugar carbonates, sugar phosphates, or carbonate-phosphate esters of sugar. Sugar carbonates usually refer to esterified products formed by substituting carbonate groups for at least part of hydroxyl groups in sugar molecules; and molecular structure of the sugar carbonates usually includes carbonate groups. Sugar phosphates usually refer to esterified products formed by substituting phosphate groups for at least part of hydroxyl groups in sugar molecules; and molecular structure of the sugar phosphates usually includes phosphate groups. The carbonate-phosphate esters of sugar usually refer to esterified products formed by substituting carbonate groups and phosphate groups for at least part of hydroxyl groups in sugar molecules; and molecular structure of the carbonate-phosphate esters of sugar usually includes carbonate groups and phosphate groups. In the molecular structure of the overcharge sensitive substance, carbonate groups and/or phosphate groups may be used as crosslinked groups to connect a plurality of monosaccharide molecules and/or polysaccharide molecules (for example, may react with a plurality of hydroxyl groups belonging to different sugar molecules to produce carbonate groups or phosphate groups) to form a part of bulk phase space structure. Alternatively, outer ends of part of unsubstituted carbonate groups and/or phosphate groups may be exposed; or alkyl groups (for example, alkyl groups of a chain length C1 to C5) may be selected according to the situation for end-capping. In this way, the conductive network in the safety layer can be better stabilized during normal use, more obvious structural changes are produced when degradation occurs, and the response rate of anti-overcharge is increased. The cross-linking in the overcharge sensitive substance should be at a level that allows normal preparation of the overcharge prevention layer, which should be known to those skilled in the art. In the overcharge sensitive substance, the monosaccharide structural units can also provide sites for sugar carbonates and sugar phosphates; carbonate groups and phosphate groups have good affinity with common electrolytes, and have good coordination interaction with Li+. In addition, the small-molecular sugar units and carbonate or phosphate fragments produced by cleavage can be quickly miscible in electrolytes containing a large amount of carbonate solvents, achieving faster response to anti-overcharge.

In the electrochemical energy storage apparatus provided in this application, the overcharge sensitive substance may be an esterified product formed by monosaccharides, polysaccharides (including oligosaccharides), or a mixture of monosaccharides and polysaccharides. Monosaccharides usually refer to a saccharide that cannot be further hydrolyzed, and the molecular structure of monosaccharides can usually include 3 to 6 carbon atoms. Polysaccharides usually refer to sugar chains formed by combining two or more monosaccharide units (for example, 2 to 10 monosaccharide units, and preferably 2, 3, 4, 5, 6, 7, 8, 9, 10, or more than 10 monosaccharide units) by glycosidic bonds. As an overcharge sensitive substance, the polysaccharides are preferably oligosaccharides containing 2 to 10 monosaccharide structural units to ensure that the overcharge sensitive substance has a suitable weight average molecular weight.

Further, in the electrochemical energy storage apparatus provided in this application, the overcharge sensitive substance is preferably sugar carbonates because carbonates have better compatibility with the electrolyte than other substances (for example, phosphates). In some embodiments of this application, the overcharge sensitive substance is a combination of one or more of carbonates of monosaccharides, carbonates of polysaccharides, carbonates of a mixture of monosaccharides and polysaccharides, and the like.

In the electrochemical energy storage apparatus provided in this application, the carbonate-based solvent may include a combination of one or more of linear carbonates, cyclic carbonates, and the like. Carbonate-based solvents specifically suitable for preparing electrolytes for the electrochemical energy storage apparatus should be known to those skilled in the art. For example, linear carbonates may be a combination of one or more of dimethyl carbonate (DMC), diethyl carbonate (DEC), dipropyl carbonate (DPC), ethyl methyl carbonate (EMC), methyl propyl carbonate (MPC), ethylene propyl carbonate (EPC), and the like; for another example, cyclic carbonates may include five-membered cyclic carbonates, six-membered cyclic carbonates, seven-membered cyclic carbonates, and seven- or larger-membered macrocyclic carbonates, and specifically may be, for example, a combination of one or more of vinyl ethylene carbonate (VEC), ethylene carbonate (EC), propylene carbonate (PC), butene carbonate (BC), fluoroethylene carbonate (FEC), and the like. In some embodiments of this application, the carbonate-based solvent used as the solvent of the electrolyte is a mixture of linear carbonates and cyclic carbonates.

In the electrochemical energy storage apparatus provided in this application, the solvent usually optionally includes a specified amount of carbonate-based solvent, so that the degradation products of the overcharge sensitive substance can be quickly dissolved in the electrolyte containing the carbonate-based solvent. In some embodiments of this application, mass of the carbonate-based solvent may account for more than 30% of total solvent mass in the electrolyte, and preferably 30% to 33%, 33% to 35%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, 90% to 92%, 92% to 95%, or 95% to 100%, or even more than 50%.

In the electrochemical energy storage apparatus provided in this application, the conductive substance in the safety layer can generally ensure that the safety layer has a conductive effect, and that when the overcharge sensitive substance degrades, the conductive substance can be pushed to move by the generated sugar unit fragments containing carbonate groups and/or phosphate groups, leading to the destruction of the conductive network in the safety layer. The conductive substance in the safety layer may include one or more of metal conductive materials, carbon-based conductive materials, polymer conductive materials, and the like. Those skilled in the art can select an appropriate metal conductive material, carbon-based conductive material, and polymer conductive material suitable for the safety layer. For example, the metal conductive material may be selected from a combination of one or more of aluminum, aluminum alloy, copper, copper alloy, nickel, nickel alloy, titanium, silver, and the like. For another example, the carbon-based conductive material may be selected from a combination of one or more of Ketjen black, mesophase carbon microspheres, activated carbon, graphite, conductive carbon black, acetylene black, carbon fiber, carbon nanotubes, graphene, and the like. For another example, the polymer conductive material may be selected from a combination of one or more of polysulfur nitrides, aliphatic conjugated polymers, aromatic ring conjugated polymers, aromatic heterocyclic conjugated polymers, and the like.

In some embodiments of this application, the conductive substance may be a carbon-based conductive material. Because of lower density and higher conductivity of the carbon-based conductive material, just a small amount of carbon-based conductive substance can achieve conductivity for the safety layer in the normal use of electrochemical energy storage apparatus, and is prone to move when the overcharge sensitive substance degrades, to destroy the conductive network, thereby improving the reliability of anti-overcharge. In some more embodiments of this application, the conductive substance is a zero-dimensional carbon-based conductive material to reduce the random bridging effect of the conductive substance in anti-overcharge response. In some further embodiments of this application, the conductive substance is optionally zero-dimensional conductive carbon black which has good conductivity and is easy to have small particle sizes.

In the electrochemical energy storage apparatus provided in this application, the binding substance in the safety layer is usually used to ensure that the safety layer is tightly bonded with the current collector and the positive electrode active substance layer. The binding substance may generally be various binders suitable for preparing positive electrode plates in the field. For example, the binding substance may be selected from a combination of one or more of polyvinylidene fluoride, vinylidene fluoride-hexafluoropropylene copolymer, polyurethane, polyacrylonitrile, polyimide, epoxy resin, silicone resin, ethylene-vinyl acetate copolymer, styrene butadiene rubber, styrene-acrylic rubber, polyacrylic acid, polyacrylic acid-acrylate copolymer, polyethylene-acrylate copolymer, and the like. In some embodiments of this application, the binding substance is selected from a combination of one or more of polyvinylidene fluoride, vinylidene fluoride-hexafluoropropylene copolymer, and the like.

In the electrochemical energy storage apparatus provided in this application, the overcharge sensitive substance and the conductive substance contained in the safety layer usually need to be in a proper proportion to guarantee the conductivity of the safety layer during normal use and the blocking ability of the safety layer in the case of overcharge. If overcharge sensitive substances are too few or the ratio of the overcharge sensitive substance to the conductive substance is too large, the conductive network may not be destroyed even after the overcharge sensitive substance degrades. In addition, the binding substance in the safety layer usually needs to be in a proper proportion to ensure the normal use of the safety layer. However, an excessively high proportion of the binding substance may hinder the destruction of the conductive network when the overcharge sensitive substance degrades. In some embodiments of this application, mass of the binding substance accounts for 30% to 60% of total mass of the safety layer, and preferably 30% to 35%, 35% to 40%, 40% to 45%, 45% to 50%, 50% to 55%, or 55% to 60%. In some other embodiments of this application, mass of the overcharge sensitive substance accounts for 25% to 50% of total mass of the safety layer, and optionally 25% to 30%, 30% to 35%, 35% to 40%, 40% to 45%, or 45% to 50%. In some other embodiments of this application, mass of the conductive substance accounts for 6% to 18% of total mass of the safety layer, and preferably 6% to 8%, 8% to 10%, 10% to 12%, 12% to 14%, 14% to 16%, or 16% to 18%.

In the electrochemical energy storage apparatus provided in this application, the positive electrode current collector may usually be a layer, and a positive electrode active substance layer may be disposed on one surface of the positive electrode current collector, or may be disposed on two surfaces of the positive electrode current collector, and a safety layer is disposed between at least one positive electrode active substance layer and the positive electrode current collector. The positive electrode current collector is usually a structure or part capable of collecting current. The positive electrode current collector may be made of various materials in the field that are suitable for the positive electrode current collector of the positive electrode plate in the electrochemical energy storage apparatus. For example, the positive electrode current collector may include but is not limited to metal foil and the like, and more specifically, may include but is not limited to copper foil, aluminum foil, and the like.

In the electrochemical energy storage apparatus provided in this application, the positive electrode active substance in the positive electrode active substance layer may generally be various materials suitable for use as the positive electrode active substance of the positive electrode plate in the electrochemical energy storage apparatus. For example, the positive electrode active substance may include a lithium manganese oxide compound and the like. The lithium manganese oxide compound may include but are not limited to a combination of one or more of lithium manganese oxides, lithium nickel manganese oxides, lithium nickel cobalt manganese oxides, and the like. The positive electrode active substance may also include various other materials suitable for use as the positive electrode active substance of the positive electrode plate in the electrochemical energy storage apparatus. For example, the positive electrode active substance may further include but is not limited to a combination of one or more of lithium cobaltate, lithium iron phosphate, lithium iron phosphate carbon coated, and the like. The positive electrode active substance layer may generally further include a binder, a conductive agent, and the like. The binder and conductive agent suitable for preparing the positive electrode active substance layer of an electrochemical energy storage apparatus should be known to those skilled in the art. For example, the binder in the positive electrode active substance layer may be a combination of one or more of styrene butadiene rubber (SBR), water-based acrylic resin (water-based acrylic resin), sodium carboxymethyl cellulose (CMC), polyvinylidene fluoride (PVDF), poly tetrafluoroethylene (PTFE), ethylene-vinyl acetate copolymer (EVA), polyvinyl alcohol (PVA), polyvinyl butyral (PVB), and the like. For another example, the conductive agent in the positive electrode active substance may be a combination of one or more of graphite, superconducting carbon, acetylene black, carbon black, Ketjen black, carbon dots, carbon nanotubes, graphene, carbon nanofibers, and the like.

In the electrochemical energy storage apparatus provided in this application, the negative electrode plate usually includes a negative electrode current collector and a negative electrode active substance layer disposed on a surface of the negative electrode current collector, and the negative electrode active substance layer usually includes a negative electrode active substance. The negative electrode current collector may generally be a layer, and a negative electrode active substance layer is disposed on one surface of the negative electrode current collector, or may be disposed on two surfaces of the negative electrode current collector. The negative electrode current collector is usually a structure or part that collects current. The negative electrode current collector may be made of various materials suitable for the negative electrode current collector of the lithium-ion battery in the art. For example, the negative electrode current collector may include but is not limited to metal foil, and more specifically, may include but is not limited to copper foil and the like.

In the electrochemical energy storage apparatus provided in this application, the negative electrode active substance in the negative electrode active substance layer may be various materials suitable for the negative electrode active substance for the lithium-ion battery in the art, for example, may include but is not limited to a combination of one or more of graphite, soft carbon, hard carbon, carbon fiber, mesophase carbon microbeads, silicon-based material, tin-based material, lithium titanate, or other metals capable of forming alloys with lithium. Graphite may be selected from a combination of one or more of artificial graphite, natural graphite, and modified graphite. The silicon-based material may be selected from a combination of one or more of elemental silicon, silicon-oxygen compound, silicon-carbon composite, and silicon alloy. The tin-based material may be selected from a combination of one or more of elemental tin, tin-oxygen compound, tin alloy, and the like. The negative electrode active substance layer may generally further include a binder, a conductive agent, and the like. The binder and conductive agent suitable for preparing the negative electrode active substance layer of an electrochemical energy storage apparatus should be known to those skilled in the art. For example, the binder in the negative electrode active substance layer may be a combination of one or more of styrene butadiene rubber (SBR), water-based acrylic resin (water-based acrylic resin), sodium carboxymethyl cellulose (CMC), polyvinylidene fluoride (PVDF), poly tetrafluoroethylene (PTFE), ethylene-vinyl acetate copolymer (EVA), polyvinyl alcohol (PVA), polyvinyl butyral (PVB), and the like. For another example, the conductive agent in the negative electrode active substance may be a combination of one or more of graphite, superconducting carbon, acetylene black, carbon black, Ketjen black, carbon dots, carbon nanotubes, graphene, carbon nanofibers, and the like.

In the electrochemical energy storage apparatus provided in this application, the separator may be made of various materials suitable for separators of lithium-ion batteries in the field, for example, may include but is not limited to a combination of one or more of polyethylene, polypropylene, polyvinylidene fluoride, kevlar, polyethylene terephthalate, polytetrafluoroethylene, polyacrylonitrile, polyimide, polyamide, polyester, natural fiber, and the like.

In the electrochemical energy storage apparatus provided in this application, the electrolytic salt included in the electrolyte may be various electrolytic salts suitable for lithium-ion batteries in the field. For example, the electrolytic salt may generally include a lithium salt and the like, and more specifically, the lithium salt may be an inorganic lithium salt and/or an organic lithium salt, specifically including but not limited to, the lithium salt may be selected from a combination of one or more of LiPF6, LiBF4, LiN(SO2F)2 (LiFSI for short), LiN(CF3SO2)2 (LiTFSI for short), LiClO4, LiAsF6, LiB(C2O4)2 (LiBOB for short), LiBF2C2O4 (LiDFOB for short). For another example, concentration of the electrolytic salt may range from 0.8 mol/L and 1.5 mol/L.

In this application, the method for preparing an electrochemical energy storage apparatus (for example, a lithium-ion battery) should be known to those skilled in the art. For example, the positive electrode active substance layer may generally include a positive electrode active substance, a binder, a conductive agent, and the like. A method for preparing the positive electrode plate may specifically include the following steps: mixing a binding substance, a conductive substance, and an overcharge sensitive substance to form a slurry, and applying the slurry on the positive electrode current collector to provide a positive electrode current collector with a safety layer; and mixing a positive electrode active substance, a binder, and a conductive agent to form a slurry, and applying the slurry on the safety layer. For another example, the negative electrode active substance layer may generally include a negative electrode active substance, a binder, a conductive agent, and the like. A method for preparing the negative electrode plate may specifically include the following step: mixing a negative electrode active substance, a binder, and a conductive agent to form a slurry, and applying the slurry on the negative electrode current collector. For another example, the positive electrode plate, the separator, and the negative electrode plate each may be a layer, which thus can be cut to a target size and then stacked in sequence, or can be wound to a target size to form an electrode assembly, and can be further combined with the electrolyte to form an electrochemical energy storage apparatus.

The following describes the embodiments of this application through specific examples, and those skilled in the art can easily understand other advantages and effects of this application from the content disclosed in this specification. This application may also be implemented or applied through other different specific embodiments, and various details in this specification can also be modified or changed based on different viewpoints and applications without departing from the spirit of this application.

It should be noted that process equipment or apparatuses not specifically noted in the following examples are conventional equipment or apparatuses in the art.

In addition, it should be understood that the one or more method steps mentioned in this application do not exclude that there may be other method steps before and after the combined steps or that other method steps may be inserted between these explicitly mentioned steps, unless otherwise specified. It should further be understood that the combination and connection relationship between one or more devices/apparatuses mentioned in this application do not exclude that there may be other devices/apparatuses before and after the combined devices/apparatuses or that other devices/apparatuses may be inserted between the two explicitly mentioned devices/apparatuses, unless otherwise specified. Moreover, unless otherwise specified, numbers of the method steps are merely a tool for identifying the method steps, but are not intended to limit the order of the method steps or to limit the implementable scope of this application. In the absence of substantial changes in the technical content, alteration or adjustment to their relative relationships shall also be considered as the implementable scope of this application.

Figure 3:
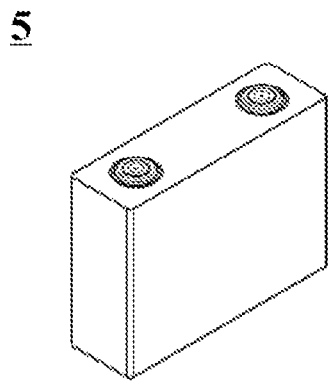
FIG. 3 is a schematic diagram of an embodiment of an electrochemical energy storage apparatus.

In an embodiment of this application, the electrochemical energy storage apparatus is a secondary battery. The shape of the secondary battery is not particularly limited in this application, which may be a cylindrical shape, a square shape, or any other shape. FIG. 3 shows a secondary battery 5 of a square structure as an example.

In some embodiments, secondary batteries may be assembled into a battery module, and the battery module may include a plurality of secondary batteries. A specific quantity may be adjusted based on application and capacity of the battery module.

Figure 4:
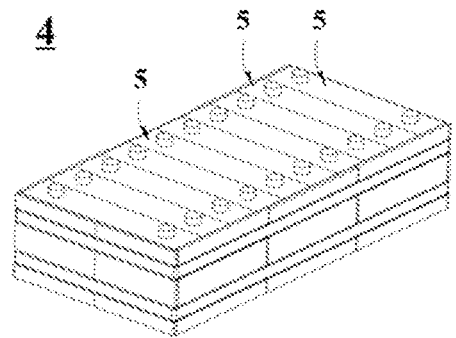
FIG. 4 is a schematic diagram of an embodiment of a battery module.

FIG. 4 shows a battery module 4 as an example. Referring to FIG. 4, in the battery module 4, a plurality of secondary batteries 5 may be sequentially arranged along a length direction of the battery module 4. Certainly, the plurality of secondary batteries may be arranged in any other manner. Further, the plurality of secondary batteries 5 may be fastened through fasteners.

In some embodiments, the battery module 4 may further include a housing with an accommodating space, and the plurality of secondary batteries 5 are accommodated in the accommodating space.

In some embodiments, battery modules may be further assembled into a battery pack, and a quantity of battery modules included in the battery pack may be adjusted based on application and capacity of the battery pack.

Figure 5:
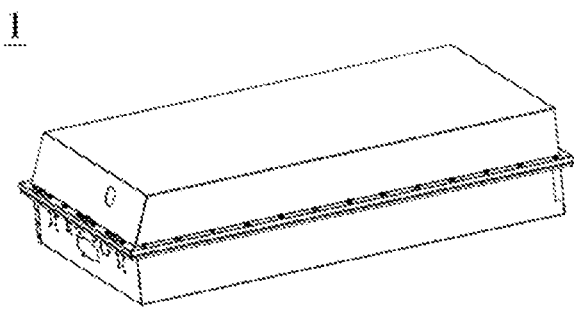
FIG. 5 is a schematic diagram of an embodiment of a battery pack.
Figure 6:
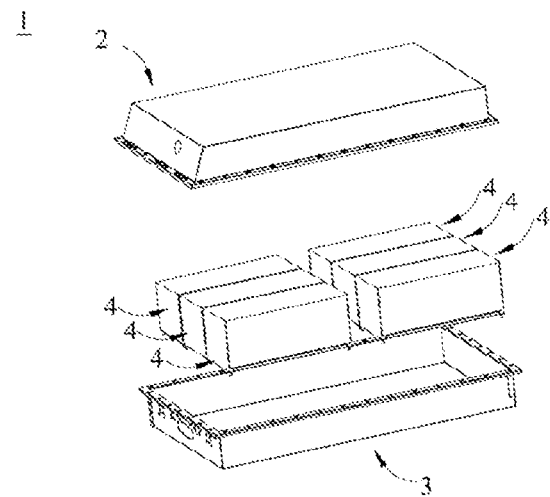
FIG. 6 is an exploded view of FIG. 5.

FIG. 5 and FIG. 6 show a battery pack 1 as an example. Referring to FIG. 5 and FIG. 6, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

Another aspect of this application provides a device, where the device includes the foregoing secondary battery, and the secondary battery may be used as a power source of the device, or may be used as an energy storage unit of the device. The device may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery (Cell), a battery module (Module), or a battery pack (Pack) may be selected for the device according to requirements for using the device.

Figure 7:
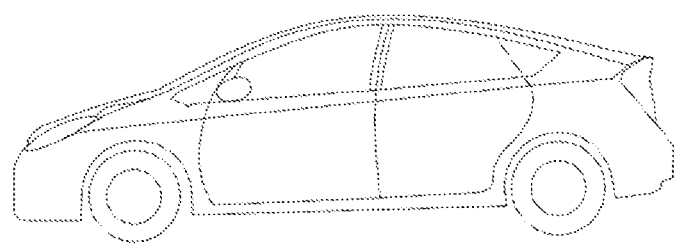
FIG. 7 is a schematic diagram of an embodiment of a device using an electrochemical energy storage apparatus as a power source.

FIG. 7 is a device as an example. The device is a battery electric vehicle, a hybrid electric vehicle, a plug-in hybrid electric vehicle, or the like. To meet requirements of the device for high power and high energy density of secondary batteries, a battery pack or a battery module may be used.

In another example, the device may be a mobile phone, a tablet computer, a notebook computer, or the like. Such device is generally required to be light and thin, and may use a secondary battery as its power source.

Examples 1 to 31

Preparation of the Positive Electrode Plate

Preparation of a safety layer slurry: A binding substance, a conductive substance, and an overcharge sensitive substance were placed into a planetary stirring tank, then N-methylpyrrolidone (NMP) that was nine times the total weight of the foregoing materials was added as a dispersing solvent, and the resulting mixture was stirred quickly for 5 hours to form a uniform and stable slurry. The ratio of the selected binding substance, conductive substance, and overcharge sensitive substance is shown in Table 1. In the ratio of Table 1, percentage of each substance was calculated based on the total weight of the binding substance, conductive substance, and overcharge sensitive substance. The percentage of each substance was equal to the value in Table 1×100% (for example, 1 corresponds to 100%, and 0.35 corresponds to 35%). Parameters of overcharge sensitive substances used in the examples are as follows:

For "carbonates of a mixture of glucose and sucrose" in Examples 1 to 14 and Comparative Example 1, the ratio of sucrose to glucose was 1:1, the esterification degree of hydroxyl groups was 0.9, and the weight average molecular weight ranged from 9000 to 11000.

For "glucose carbonates" in Example 15, the esterification degree of hydroxyl groups was 0.9, and the weight average molecular weight ranged from 9000 to 11000.

For "sucrose carbonates" in Example 16, the esterification degree of hydroxyl groups was 0.88, and the weight average molecular weight ranged from 5000 to 7000.

For "sucrose phosphates" in Example 17, the esterification degree of hydroxyl groups was 0.92, and the weight average molecular weight ranged from 7000 to 9000.

For "mixtures of sucrose carbonates and sucrose phosphates" in Example 18, sucrose firstly undergone carbonate esterification with a molecular weight of 3000 to 4000 and an esterification degree of 0.6 to obtain sucrose carbonates, and then the products undergone phosphate esterification with the esterification degree of 0.9 and the weight average molecular weight of 5000 to 7000 to obtain sucrose phosphates.

For "γ-cyclodextrin carbonates" in Example 19, the esterification degree was 0.9, and the weight average molecular weight ranged from 5000 to 7000.

For "degraded cellulose carbonates" in Example 20 and Examples 22 to 31, molecular weight of the raw material degraded cellulose ranged from 1000 to 1500, the weight average molecular weight of the sensitive substance ranged from 10000 to 12000, the esterification degree was 0.85, and methyl was used for full end-capping.

For "degraded chitosan carbonates" in Example 21, the weight average molecular weight of the degraded chitosan of the raw material ranged from 1000 to 1500, the weight average molecular weight of the sensitive substance ranged from 10000 to 12000, methyl was used for full end-capping, and the esterification degree was 0.86.

The weight average molecular weight of the degraded cellulose in Comparative Example 2 ranged from 10000 to 12000.

The foregoing uniform and stable slurry was vacuumed to remove bubbles, and the safety layer slurry was applied on one or two surfaces of the positive electrode current collector (see Table 1 for single-sided or double-sided coating), and a uniform and dense safety layer was obtained after drying. The thickness of the metal conductive layer aluminum foil was 12 μm, the thickness of the safety layer for single-sided coating was 3 m, and the thickness of the safety layer for double-sided coating was 1.5 μm.

The positive electrode active substance (which was LCO in Example 10, and LiNi0.8Co0.1Mn0.1O2 in all other examples), the conductive agent Super-P, and the binder PVDF were dispersed in the solvent NMP at a weight ratio of 95:2:3, and were stirred and mixed uniformly to obtain a positive electrode slurry. The positive electrode slurry was applied on the surface of the safety layer. After drying and cold pressing, a positive electrode plate was obtained.

TABLE 1

| | Overcharge sensitive substance | Proportion of overcharge sensitive substance | Type of solvent | Mass ratio of solvents | Proportion of carbonates in solvent | Molar ratio of Ni, Co, and Mn in positive electrode active material | Capacity per unit area (mAh/cm²) | Type of conductive agent | Proportion of conductive agent | Type of binding substance | Proportion of binding substance | Number of layers |
|---|---|---|---|---|---|---|---|---|---|---|---|---|
| Example 1 | Carbonates of mixture of glucose and sucrose | 0.35 | EC + ethyl acetate + fluorinated ether | 1:1:1 | 0.33 | 8:1:1 | 3.12 | Conductive carbon black | 0.1 | PVDF | 0.55 | Single |
| Example 2 | Carbonates of mixture of glucose and sucrose | 0.35 | Ethyl acetate + EC + DMC | 0.5:0.25:0.25 | 0.5 | 8:1:1 | 3.12 | Conductive carbon black | 0.1 | PVDF | 0.55 | Single |
| Example 3 | Carbonates of mixture of glucose and sucrose | 0.35 | EC + fluorinated ether | 0.65:0.35 | 0.65 | 8:1:1 | 3.12 | Conductive carbon black | 0.1 | PVDF | 0.55 | Single |
| Example 4 | Carbonates of mixture of glucose and sucrose | 0.35 | EC + fluorinated ether | 0.75:0.25 | 0.75 | 8:1:1 | 3.12 | Conductive carbon black | 0.1 | PVDF | 0.55 | Single |
| Example 5 | Carbonates of mixture of glucose and sucrose | 0.35 | EC + DMC + fluorinated ether | 0.45:0.47:0.08 | 0.92 | 8:1:1 | 3.12 | Conductive carbon black | 0.1 | PVDF | 0.55 | Single |
| Example 6 | Carbonates of mixture of glucose and sucrose | 0.35 | EC + DMC + ethyl acetate | 0.45:0.5:0.05 | 0.95 | 8:1:1 | 3.12 | Conductive carbon black | 0.1 | PVDF | 0.55 | Single |

TABLE 1-continued

| | Overcharge sensitive substance | Proportion of overcharge sensitive substance | Type of solvent | Mass ratio of solvents | Proportion of carbonates in solvent | Molar ratio of Ni, Co, and Mn in positive electrode active material | Capacity per unit area (mAh/cm$^2$) | Type of conductive agent | Proportion of conductive agent | Type of binding substance | Proportion of binding substance | Number of layers |
|---|---|---|---|---|---|---|---|---|---|---|---|---|
| Example 7 | Carbonates of mixture of glucose and sucrose | 0.35 | EC + PC + DMC | 1:1:1 | 1 | 8:1:1 | 3.12 | Conductive carbon black | 0.1 | PVDF | 0.55 | Single |
| Example 8 | Carbonates of mixture of glucose and sucrose | 0.35 | PC + EC + DMC | 1:1:1 | 1 | 8:1:1 | 3.12 | Conductive carbon black | 0.1 | PVDF | 0.55 | Single |
| Example 9 | Carbonates of mixture of glucose and sucrose | 0.35 | EC | — | 1 | 8:1:1 | 3.12 | Conductive carbon black | 0.1 | PVDF | 0.55 | Single |
| Example 10 | Carbonates of mixture of glucose and sucrose | 0.35 | EC + DMC | 1:1 | 1 | LCO (lithium cobolt oxide) | 3.12 | Conductive carbon black | 0.1 | PVDF | 0.55 | Single |
| Example 11 | Carbonates of mixture of glucose and sucrose | 0.35 | EC + DMC | 1:1 | 1 | 8:1:1 | 1.2 | Conductive carbon black | 0.1 | PVDF | 0.55 | Single |
| Example 12 | Carbonates of mixture of glucose and sucrose | 0.35 | EC + DMC | 1:1 | 1 | 8:1:1 | 4.5 | Conductive carbon black | 0.1 | PVDF | 0.55 | Single |

TABLE 1-continued

| | Overcharge sensitive substance | Proportion of overcharge sensitive substance | Type of solvent | Mass ratio of solvents | Proportion of carbonates in solvent | Molar ratio of Ni, Co, and Mn in positive electrode active material | Capacity per unit area (mAh/cm²) | Type of conductive agent | Proportion of conductive agent | Type of binding substance | Proportion of binding substance | Number of layers |
|---|---|---|---|---|---|---|---|---|---|---|---|---|
| Example 13 | Carbonates of mixture of glucose and sucrose | 0.35 | EC + DMC | 1:1 | 1 | 8:1:1 | 5.2 | Conductive carbon black | 0.1 | PVDF | 0.55 | Single |
| Example 14 | Carbonates of mixture of glucose and sucrose | 0.35 | EC + DMC | 1:1 | 1 | 8:1:1 | 6.2 | Conductive carbon black | 0.1 | PVDF | 0.55 | Single |
| Example 15 | Glucose carbonates | 0.35 | EC + DMC | 1:1 | 1 | 8:1:1 | 3.12 | Conductive carbon black | 0.1 | PVDF | 0.55 | Single |
| Example 16 | Sucrose carbonates | 0.35 | EC + DMC | 1:1 | 1 | 8:1:1 | 3.12 | Conductive carbon black | 0.1 | PVDF-HPF | 0.55 | Single |
| Example 17 | Sucrose phosphates | 0.35 | EC + DMC | 1:1 | 1 | 8:1:1 | 3.12 | Conductive carbon black | 0.1 | PVDF | 0.55 | Single |
| Example 18 | Mixtures of sucrose carbonates and sucrose phosphates | 0.35 | EC + DMC | 1:1 | 1 | 8:1:1 | 3.12 | Conductive carbon black | 0.1 | PVDF | 0.55 | Single |
| Example 19 | γ-cyclodextrin carbonates | 0.35 | EC + DMC | 1:1 | 1 | 8:1:1 | 3.12 | Conductive carbon black | 0.1 | Polyacrylic acid | 0.55 | Single |
| Example 20 | Degraded cellulose carbonates | 0.35 | EC + DMC | 1:1 | 1 | 8:1:1 | 3.12 | Conductive carbon black | 0.1 | SBR + CMC | 0.55 | Single |
| Example 21 | Degraded chitosan carbonates | 0.35 | EC + DMC | 1:1 | 1 | 8:1:1 | 3.12 | Conductive carbon black | 0.1 | PVDF | 0.55 | Single |
| Example 22 | Degraded cellulose carbonates | 0.22 | EC + DMC | 1:1 | 1 | 8:1:1 | 3.12 | Conductive carbon black | 0.1 | PVDF | 0.68 | Single |
| Example 23 | Degraded cellulose carbonates | 0.25 | EC + DMC | 1:1 | 1 | 8:1:1 | 3.12 | Conductive carbon black | 0.15 | PVDF | 0.60 | Single |

TABLE 1-continued

| | Overcharge sensitive substance | Proportion of overcharge sensitive substance | Type of solvent | Mass ratio of solvents | Proportion of carbonates in solvent | Molar ratio of Ni, Co, and Mn in positive electrode active material | Capacity per unit area (mAh/cm²) | Type of conductive agent | Proportion of conductive agent | Type of binding substance | Proportion of binding substance | Number of layers |
|---|---|---|---|---|---|---|---|---|---|---|---|---|
| Example 24 | Degraded cellulose carbonates | 0.42 | EC + DMC | 1:1 | 1 | 8:1:1 | 3.12 | Conductive carbon black | 0.06 | PVDF | 0.52 | Single |
| Example 25 | Degraded cellulose carbonates | 0.50 | EC + DMC | 1:1 | 1 | 8:1:1 | 3.12 | Conductive carbon black | 0.06 | PVDF | 0.44 | Single |
| Example 26 | Degraded cellulose carbonates | 0.52 | EC + DMC | 1:1 | 1 | 8:1:1 | 3.12 | Conductive carbon black | 0.18 | PVDF | 0.30 | Single |
| Example 27 | Degraded cellulose carbonates | 0.35 | EC + DMC | 1:1 | 1 | 8:1:1 | 3.12 | All powder | 0.1 | PVDF | 0.55 | Single |
| Example 28 | Degraded cellulose carbonates | 0.35 | EC + DMC | 1:1 | 1 | 8:1:1 | 3.12 | CNT | 0.1 | PVDF | 0.55 | Single |
| Example 29 | Degraded cellulose carbonates | 0.35 | EC + DMC | 1:1 | 1 | 8:1:1 | 3.12 | Acetylene black | 0.1 | PVDF | 0.55 | Single |
| Example 30 | Degraded cellulose carbonates | 0.35 | EC + DMC | 1:1 | 1 | 8:1:1 | 3.12 | Conductive graphite | 0.1 | PVDF | 0.55 | Single |
| Example 30 | Degraded cellulose carbonates | 0.35 | EC + DMC | 1:1 | 1 | 8:1:1 | 3.12 | Conductive carbon black | 0.1 | PVDF | 0.55 | Double |
| Comparative Example 1 | Carbonates of mixture of glucose and sucrose | 0.35 | Fluorinated ether + ethyl acetate | 1:1 | 0 | 8:1:1 | 3.12 | Conductive carbon black | 0.1 | PVDF | 0.55 | Single |
| Comparative Example 2 | Degraded cellulose | 0.35 | EC + DMC | 1:1 | 0 | 8:1:1 | 3.12 | Conductive carbon black | 0.1 | PVDF | 0.55 | Single |
| Comparative Example 3 | / | / | EC + DMC | 1:1 | 0 | 8:1:1 | 3.12 | Conductive carbon black | 0.1 | PVDF | 0.90 | Single |
| Comparative Example 4 | / | / | EC + DMC | 1:1 | 0 | 8:1:1 | 3.12 | / | / | / | / | / |

Preparation of the Negative Electrode Plate:

A negative electrode active substance artificial graphite, a conductive agent Super-P, a binder styrene butadiene rubber (SBR), and sodium carboxymethyl cellulose (CMC) were dispersed in the solvent deionized water at a weight ratio of 93:3:2:2, and stirred and mixed uniformly, to obtain a negative electrode slurry. Then the negative electrode slurry was applied on the two opposite surfaces of the negative electrode current collector copper foil, followed by drying and cold pressing, and then a negative electrode plate was obtained.

Preparation of the Electrolyte:

The organic solvents were mixed according to the type and mass ratio shown in Table 1, and then the lithium salt LiPF6 was dissolved in the foregoing organic solvents and mixed uniformly to obtain an electrolyte, where concentration of LiPF6 was 1 mol/L.

Preparation of the Lithium-Ion Secondary Battery:

The positive electrode plate, a separator porous polyethylene, and the negative electrode plate were stacked in order and the resulting stack was wound to obtain a battery cell; and the battery cell was placed in an outer package, the electrolyte was injected, and then the outer package was sealed to obtain a lithium-ion secondary battery.

Comparative Example 1

For the preparation method of Comparative Example 1, refer to Example 3. The difference was that the solvent in the electrolyte was a mixture of fluorinated ether (1,1,2,2-tetrafluoroethyl-2,2,2-trifluoroethyl ether) and ethyl acetate with a ratio of 1:1.

Comparative Example 2

For the preparation method of Comparative Example 2, refer to Example 31. The difference was that in the prepared safety layer slurry, the overcharge sensitive substance was replaced by degraded cellulose, and the coating scheme was single-sided coating.

Comparative Example 3

For the preparation method of Comparative Example 3, refer to Example 31. The difference was that no overcharge sensitive substance was added to the prepared safety layer slurry, the ratio of the conductive substance was 90%, and the coating scheme was single-sided coating.

Comparative Example 4

For the preparation method of Comparative Example 3, refer to Example 31. The difference was that in the process of preparing the positive electrode plate, the active substance layer was directly prepared on two surfaces of the positive electrode current collector, and no safety layer was added at all.

Figure 2:
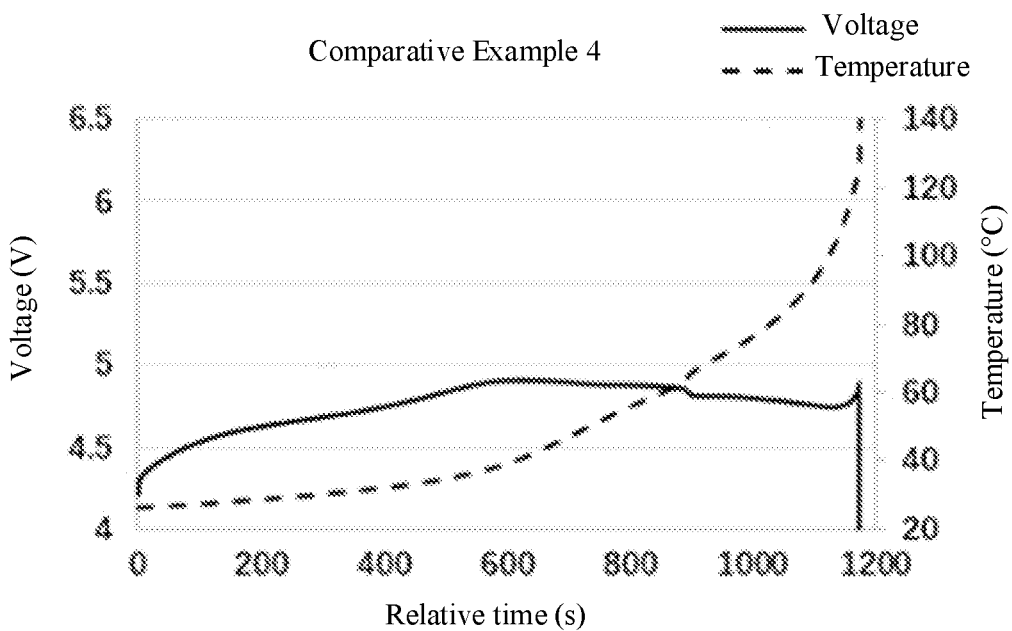
FIG. 2 is a schematic diagram of voltage and temperature changes in overcharge safety performance test for one of batteries in Comparative Example 4 of this application.

Test Part:

(1) Overcharge Safety Performance Test for the Lithium-Ion Secondary Battery:

At 25±2° C., the lithium-ion secondary battery was charged to 4.25 V at a constant current rate of 1 C, then charged to a current of 0.05 C at a constant voltage of 4.25 V, and then left for 30 minutes. Then, the battery was fixed with a clamper and placed on an overcharge safety test device with ambient temperature controlled at 25±2° C. After being left for 5 minutes, the fully charged battery was overcharged at a rate of 1 C, and the real-time voltage and temperature changes of each battery were recorded until the battery caught a fire or exploded or the charging stopped. Six batteries were tested for each of the examples and comparative examples. The test passed if no battery caught a fire or exploded; otherwise, the test failed. For details about overcharge safety performance test results of Examples and Comparative Examples, see Table 2. In addition, FIG. 1 is a schematic diagram of voltage and temperature changes in overcharge safety performance test for one of batteries in Example 7; and FIG. 2 is a schematic diagram of voltage and temperature changes in the overcharge safety performance test for one of batteries in Comparative Example 4.

(2) Cycling Performance Test for the Lithium-Ion Secondary Battery:

At 45±2° C., the lithium-ion secondary battery was charged to 4.25 V at a constant current of 1 C, charged to a current of 0.05 C at a constant voltage of 4.25 V, left for 5 min, and then discharged to 2.8 V at a constant current of 1 C, which was one charge and discharge cycle. Discharge capacity of this cycle was discharge capacity of the first cycle. The lithium-ion secondary battery was tested according to the foregoing method for 200 charge and discharge cycles, and the discharge capacity of each cycle was recorded.

Cycling capacity retention rate=(Discharge capacity of the 100th cycle/Discharge capacity of the first cycle)×100%

For details about cycling performance test results of Examples and Comparative Examples, see Table 2.

Test results of Examples 1 to 31 and Comparative Examples 1 to 4 are shown in Table below.

TABLE 2

|  | Overcharge test pass rate | Capacity retention rate after 200 cycles at 45° C. |
| --- | --- | --- |
| Example 1 | 3/6 | 86.4% |
| Example 2 | 5/6 | 90.9% |
| Example 3 | 6/6 | 90.1% |
| Example 4 | 6/6 | 90.5% |
| Example 5 | 6/6 | 93.8% |
| Example 6 | 6/6 | 93.6% |
| Example 7 | 6/6 | 94.2% |
| Example 8 | 6/6 | 93.9% |
| Example 9 | 6/6 | 91.2% |
| Example 10 | 6/6 | 93.8% |
| Example 11 | 6/6 | 94.8% |
| Example 12 | 6/6 | 91.5% |
| Example 13 | 6/4 | 89.3% |
| Example 14 | 6/2 | 83.3% |
| Example 15 | 6/6 | 94.0% |
| Example 16 | 6/6 | 94.1% |
| Example 17 | 3/6 | 94.4% |
| Example 18 | 5/6 | 94.2% |
| Example 19 | 6/6 | 93.7% |
| Example 20 | 6/6 | 94.3% |
| Example 21 | 6/6 | 94.1% |
| Example 22 | 3/6 | 94.2% |
| Example 23 | 5/6 | 94.1% |
| Example 24 | 6/6 | 94.2% |
| Example 25 | 6/6 | 94.0% |
| Example 26 | 6/6 | 92.6% |
| Example 27 | 2/6 | 94.1% |
| Example 28 | 4/6 | 93.8% |
| Example 29 | 5/6 | 94.0% |
| Example 30 | 3/6 | 93.4% |
| Example 31 | 6/6 | 94.1% |
| Comparative Example 1 | 0/6 | 82.6% |
| Comparative Example 2 | 0/6 | 93.8% |

TABLE 2-continued

| | Overcharge test pass rate | Capacity retention rate after 200 cycles at 45° C. |
|---|---|---|
| Comparative Example 3 | 0/6 | 93.7% |
| Comparative Example 4 | 0/6 | 93.2% |

It could be learned from the test results of Examples 1 to 31 that the secondary battery using the positive electrode plate described in this application had a high overcharge safety test pass rate, and a good capacity retention rate after 200 cycles at 45° C. In addition, it could be seen from FIG. 1 that when the positive electrode plate was overcharged, the temperature gradually increased. After a specified temperature was reached, the overcharge sensitive substance in the safety layer degraded, causing the conductive network to break, so that internal resistance of the electrochemical energy storage apparatus increased sharply, to cut off the charging current in time.

The test result of Comparative Example 1 showed that if the electrolyte did not contain carbonate solvents, the overcharge safety test failed, and the capacity retention rate after 200 cycles at 45° C. was low.

The test result of Comparative Example 2 showed that the use of polysaccharides without carbonate groups or phosphate groups to replace the overcharge sensitive substance in this application could not achieve the effect of anti-overcharge.

The test result of Comparative Example 3 showed that if a conductive substance was used to replace the overcharge sensitive substance in this application, the secondary battery could not pass the overcharge safety test.

The test result of Comparative Example 4 showed that the secondary battery using the conventional positive electrode plate could not pass the overcharge safety test. In addition, as shown in FIG. 2, after the battery was overcharged, the temperature gradually increased, and the battery caught a fire in about 1200 seconds.

In conclusion, this application effectively overcomes various shortcomings in the prior art and has high industrial utilization value.

According to the disclosure and teaching of this specification, a person skilled in the art may further make changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. An electrochemical energy storage apparatus, comprising a positive electrode plate, a negative electrode plate, a separator disposed between the positive electrode plate and the negative electrode plate, and an electrolyte, wherein the positive electrode plate comprises a positive electrode current collector, a positive electrode active substance layer disposed on at least one surface of the positive electrode current collector, and a safety layer disposed between the positive electrode active substance layer and the positive electrode current collector, the positive electrode active substance layer comprises a positive electrode active substance, and the safety layer comprises a binding substance, a conductive substance, and an overcharge sensitive substance;
the overcharge sensitive substance is a polymer containing monosaccharide structural units and containing at least one of carbonate groups or phosphate groups; and
the electrolyte comprises a solvent and an electrolytic salt, and the solvent comprises a carbonate-based solvent.

2. The electrochemical energy storage apparatus according to claim 1, wherein the overcharge sensitive substance in the positive electrode plate degrades under the condition that the electrochemical energy storage apparatus is at a charging voltage of α V and temperature of β° C., wherein 4.2≤α≤5.5, and 35≤β≤80.

3. The electrochemical energy storage apparatus according to claim 1, wherein single-sided capacity per unit area of the positive electrode active substance layer ranges from 1.0 mAh/cm² to 6.5 mAh/cm².

4. The electrochemical energy storage apparatus according to claim 1, wherein capacity per unit area of the positive electrode active substance layer ranges from 1.2 mAh/cm² to 4.5 mAh/cm².

5. The electrochemical energy storage apparatus according to claim 1, wherein the overcharge sensitive substance is selected from a combination of one or more of sugar carbonates, sugar phosphates, and carbonate-phosphate esters of sugar.

6. The electrochemical energy storage apparatus according to claim 1, wherein the overcharge sensitive substance is selected from a combination of one or more of carbonates of monosaccharides, carbonates of polysaccharides, and of carbonates of a mixture of monosaccharides and polysaccharides.

7. The electrochemical energy storage apparatus according to claim 1, wherein the carbonate-based solvent comprises a combination of one or more of linear carbonates and cyclic carbonates.

8. The electrochemical energy storage apparatus according to claim 1, wherein the carbonate-based solvent is a mixture of a linear carbonate and a cyclic carbonate.

9. The electrochemical energy storage apparatus according to claim 1, wherein mass of the carbonate-based solvent accounts for more than 30% of total solvent mass in the electrolyte.

10. The electrochemical energy storage apparatus according to claim 1, wherein the conductive substance is selected from a combination of one or more of metal conductive materials, carbon-based conductive materials, and polymer conductive materials.

11. The electrochemical energy storage apparatus according to claim 1, wherein the metal conductive material is selected from a combination of one or more of aluminum, aluminum alloy, copper, copper alloy, nickel, nickel alloy, titanium, and silver, the carbon-based conductive material is selected from a combination of one or more of Ketjen black, mesophase carbon microspheres, activated carbon, graphite, conductive carbon black, acetylene black, carbon fiber, carbon nanotubes, and graphene, and the polymer conductive material is selected from a combination of one or more of polysulfur nitrides, aliphatic conjugated polymers, aromatic ring conjugated polymers, and aromatic heterocyclic conjugated polymers.

12. The electrochemical energy storage apparatus according to claim 1, wherein the binding substance is selected from a combination of one or more of polyvinylidene fluoride, vinylidene fluoride-hexafluoropropylene copolymer, polyurethane, polyacrylonitrile, polyimide, epoxy resin, silicone resin, ethylene-vinyl acetate copolymer, styrene butadiene rubber, styrene-acrylic rubber, polyacrylic acid, polyacrylic acid-acrylate copolymer, and polyethylene-acrylate copolymer.

13. A battery module, comprising the electrochemical energy storage apparatus according to claim 1.

14. A battery pack, comprising the battery module according to claim 13.

15. The electrochemical energy storage apparatus according to claim 1, wherein the mass of the carbonate-based solvent accounts for more than 50% of the total solvent mass in the electrolyte.

16. The electrochemical energy storage apparatus according to claim 1, wherein preferably, the binding substance is selected from a combination of one or more of polyvinylidene fluoride and vinylidene fluoride-hexafluoropropylene copolymer.

17. The electrochemical energy storage apparatus according to claim 1, wherein mass of the binding substance accounts for 30% to 60% of total mass of the safety layer; and/or
    mass of the overcharge sensitive substance accounts for 25% to 50% of total mass of the safety layer; and/or
    mass of the conductive substance accounts for 6% to 18% of total mass of the safety layer.

18. A device comprising the electrochemical energy storage apparatus according to claim 17, wherein the device is one selected from the group of electric vehicles, electric ships, electric tools, electronic devices, and energy storage systems.

* * * * *